(12) United States Patent
Narasimhan et al.

(10) Patent No.: US 12,125,022 B2
(45) Date of Patent: Oct. 22, 2024

(54) DATA SECURITY SYSTEMS CONFIGURED TO DETECT MICROCONTROLLERS IN PHYSICAL WALLETS

(71) Applicant: PAYPAL, INC., San Jose, CA (US)

(72) Inventors: Srivathsan Narasimhan, Saratoga, CA (US); Satish Narayan Govindarajan, Los Altos, CA (US)

(73) Assignee: PAYPAL, INC., San Jose, CA (US)

( * ) Notice: Subject to any disclaimer, the term of this patent is extended or adjusted under 35 U.S.C. 154(b) by 663 days.

(21) Appl. No.: 17/099,561

(22) Filed: Nov. 16, 2020

(65) Prior Publication Data

US 2021/0073792 A1 Mar. 11, 2021

Related U.S. Application Data

(63) Continuation of application No. 15/367,062, filed on Dec. 1, 2016, now Pat. No. 10,839,375.

(51) Int. Cl.

| | |
|---|---|
| *G06Q 40/00* | (2023.01) |
| *G06Q 20/34* | (2012.01) |
| *G06Q 20/36* | (2012.01) |
| *G06Q 20/40* | (2012.01) |
| *G06Q 40/12* | (2023.01) |

(Continued)

(52) U.S. Cl.
CPC ......... *G06Q 20/363* (2013.01); *G06Q 20/341* (2013.01); *G06Q 20/367* (2013.01); *G06Q 20/409* (2013.01); *G06Q 40/00* (2013.01); *G06Q 40/128* (2013.12); *H04L 63/1441* (2013.01); *G06K 19/0723* (2013.01); *H04L 63/0861* (2013.01)

(58) Field of Classification Search
CPC .. G06Q 20/363; G06Q 40/128; G06Q 20/341; G06Q 20/367; G06Q 20/409; G06Q 40/00; H04L 63/1441
See application file for complete search history.

(56) References Cited

U.S. PATENT DOCUMENTS

| | | | | |
|---|---|---|---|---|
| 2007/0073585 | A1* | 3/2007 | Apple | G06Q 30/0247 |
| | | | | 705/14.46 |
| 2010/0145861 | A1* | 6/2010 | Law | G06Q 20/3821 |
| | | | | 705/40 |

FOREIGN PATENT DOCUMENTS

CN 104702411 A * 6/2015

OTHER PUBLICATIONS

Stephen Ezell, Explaining International IT Application Leadership: Contactless Mobile Payments, Nov. 2009, The Information Technology & Innovation Foundation, web, 2-46 (Year: 2009).*

* cited by examiner

*Primary Examiner* — I Jung Liu
(74) *Attorney, Agent, or Firm* — Haynes and Boone, LLP

(57) ABSTRACT

Various systems, mediums, and methods may be implemented to provide data security by detecting microcontrollers in physical wallets. One example method may include detecting that a physical wallet comprises a plurality of physical cards based at least on a communication with a microcontroller of the physical wallet; comparing the plurality of physical cards with a plurality of digital cards of a digital wallet that corresponds the physical wallet; detecting at least one missing physical card from the physical wallet based at least on comparing the plurality of physical cards with the plurality of digital cards; and transmitting a notification to one or more user devices with access to the digital wallet. The notification may indicate information identifying the at least one missing physical card.

20 Claims, 11 Drawing Sheets

(51) Int. Cl.
*H04L 9/40* (2022.01)
*G06K 19/07* (2006.01)

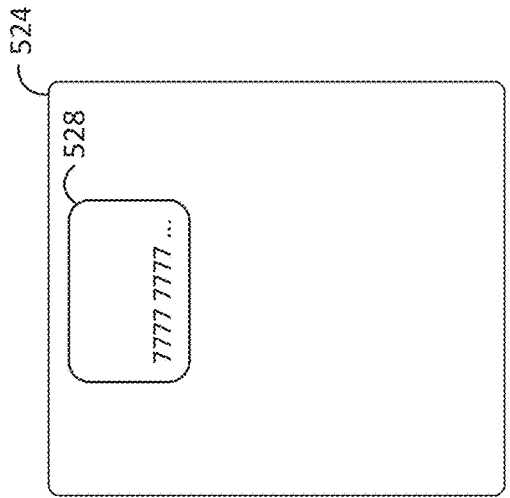
FIG. 5A
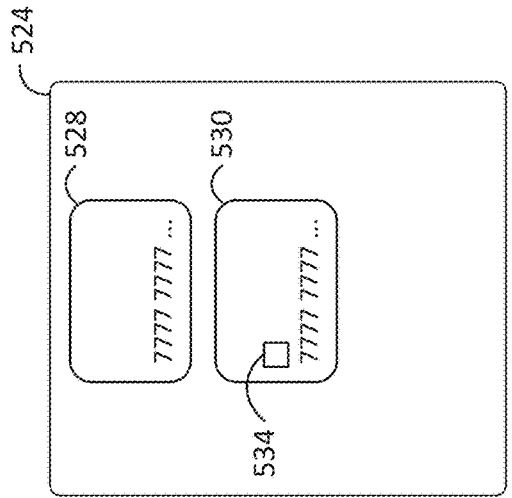
FIG. 5B
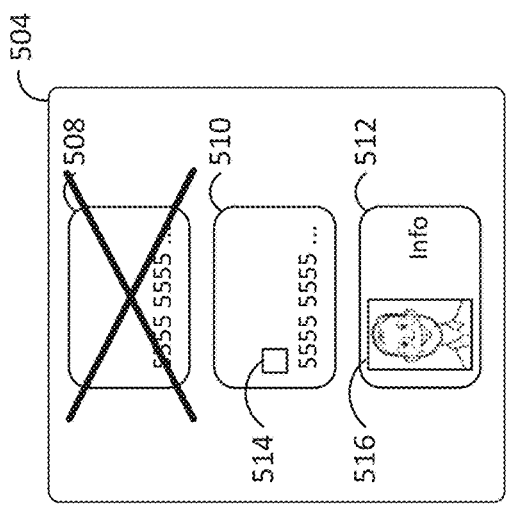
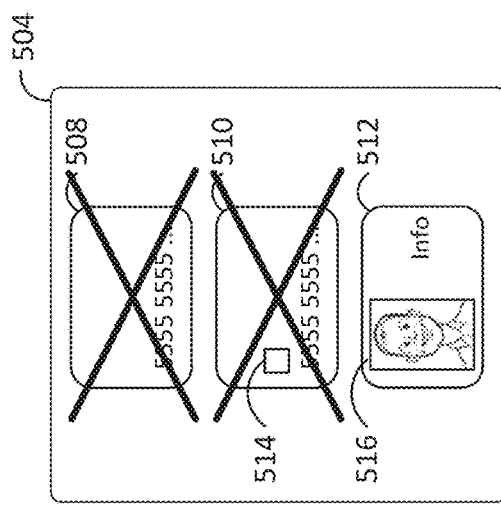

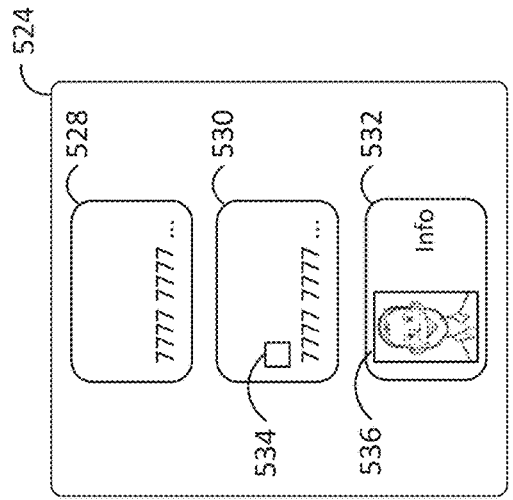
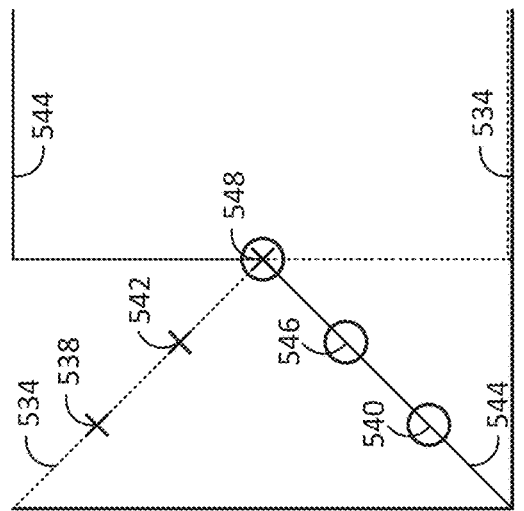
FIG. 5C
FIG. 5D

DATA SECURITY SYSTEMS CONFIGURED TO DETECT MICROCONTROLLERS IN PHYSICAL WALLETS

CROSS REFERENCE TO RELATED APPLICATIONS

This application is a continuation of U.S. application Ser. No. 15/367,062, filed Dec. 1, 2016, which is incorporated herein by reference in entirety.

BACKGROUND

Data is becoming increasingly more prevalent in the modern world. In various circumstances, data may be relied upon to perform multiple activities within a given day. For example, a user may use physical card based payments for shopping. Such cards have data such as personal and financial information on them. Further, a user may use biometric data to obtain access to a mobile device. The user may also rely on account data to perform a transaction at a store. Further, the user may be required to provide identity data to authenticate the transaction. However, there may also be multiple risks associated with the security of using various forms of such data. In some instances, the risks may involve the data being compromised, possibly where the data may be taken by an unauthorized user by physical and/or electronic means.

Using biometric data (e.g., a digital file containing a user's fingerprint pattern to authenticate the user may be undesirable because when the biometric data is stolen, the user may not be able to easily modify her biometric data (e.g., the fingerprint pattern) to prevent its unauthorized use. When a physical wallet is lost or stolen, the physical identity and payment instruments, including data on those instruments can be compromised. Replacing compromised instruments involves authenticating oneself with various issuing authorities. As such, there are various problems in both physical and digital technology (e.g., mobile technology, systems, and infrastructures) associated with data security and authentication.

BRIEF DESCRIPTION OF THE DRAWINGS

FIGS. 5A-D illustrate a number of deactivated cards, according to an embodiment.

Figure 1A:
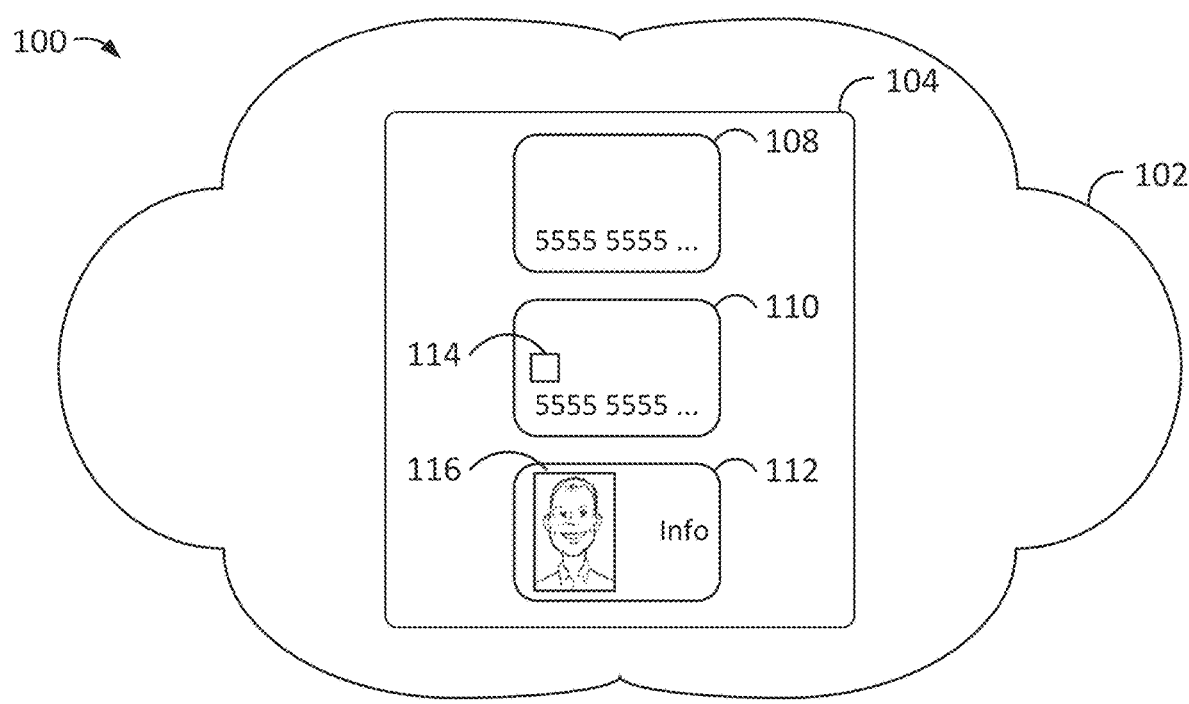
FIG. 1A illustrates a system associated with a number of digital wallets, according to an embodiment.
Figure 1A:
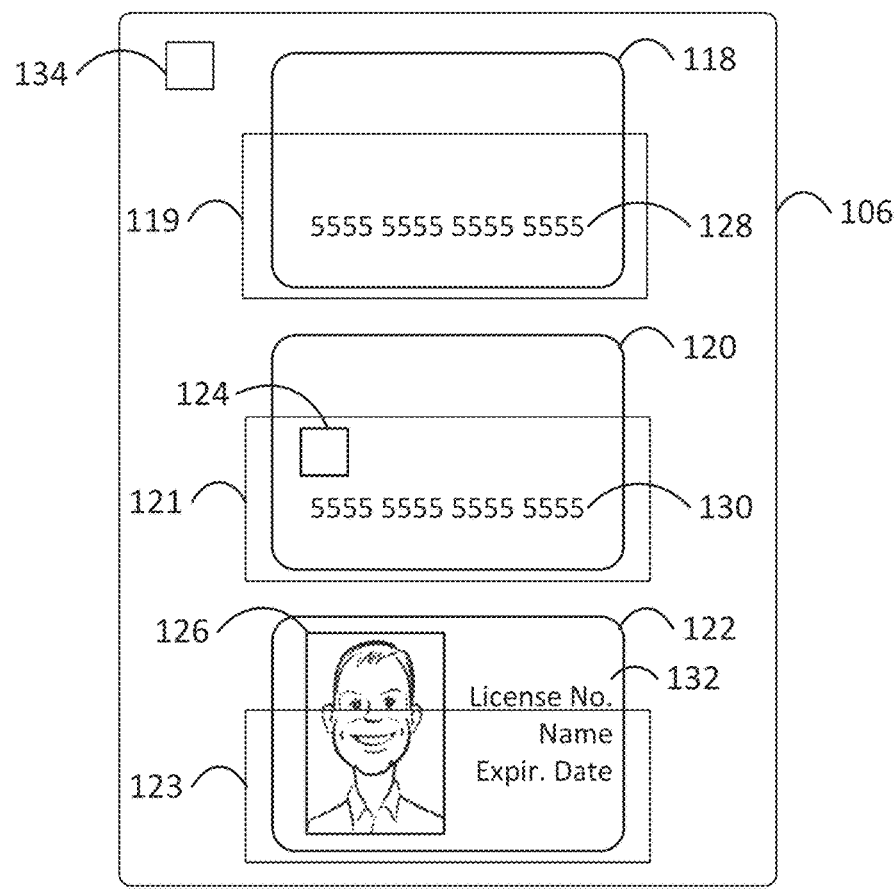

Embodiments of the present disclosure and their advantages may be understood by referring to the detailed description herein. It should be appreciated that reference numerals may be used to illustrate various elements and features provided in the figures. The figures may illustrate various examples for purposes of illustration and explanation related to the embodiments of the present disclosure and not for purposes of any limitation.

DETAILED DESCRIPTION

As described herein, there are various technical problems in technology associated with data security. For example, a user may misplace or lose their physical wallet, which may include the user's identification card, credit card, debit card and/or other account or identity information. The user's data may then be at risk, where the data may be on physical instruments in the user's wallet. In some instances, the user may not know whether the wallet has been misplaced at a location that the user cannot recall, whether the wallet has been lost and unable to be returned, and/or whether the wallet has been stolen or taken by an unauthorized person. Nonetheless, the user may contact the appropriate issuers of the cards to cancel or deactivate the cards due to the potential risks with unauthorized uses of the cards and request replacement cards. However, the user may then be left waiting for the replacement cards to be delivered from the issuers, possibly leaving the user without any instruments to make further transactions. In particular, the user may be left with delays and problems with longer wait times, possibly where the user may need to make transactions.

To resolve such problems, the systems described herein may be configured to communicate with the user's physical wallet. For example, the physical wallet may include a microcontroller and/or a processor configured to wirelessly communicate with various mobile devices, modems, and/or remote servers, among other devices. As such, the systems described herein may detect the location of the physical wallet and transmit a notification to the user's mobile phone indicating the location of the physical wallet. Further, the microcontroller of the physical wallet may also be configured to read radio frequency identification (RFID) data from RFID chips in each of the cards in the physical wallet. As such, the microcontroller may detect each of the cards, and the systems may determine the presence of each of the cards in the user's wallet. The systems may also transmit notifications to the user's phone to indicate whether a particular card is present in the wallet or is absent (e.g., missing) from the wallet.

In some embodiments, a physical wallet may include a number of detection sleeves configured to detect the presence or absence of a physical payment instrument (e.g., a plastic or metal credit card). For example, the detection sleeves may identify the particular cards in the user's wallet based on the respective EMV (e.g., EUROPAY, MASTERCARD, AND VISA) chips in each of the cards. In some instances, the detection sleeves may include EMV readers configured to read the respective EMV chips in each of the cards. As such, the microcontroller of the user's wallet may communicate with the detection sleeves to detect and identify the cards in the user's wallet. In some instances, the systems described herein may communicate with the microcontroller via wireless communications (e.g., BLUETOOTH) to identify the cards in the user's wallet and determine the balances associated with each of the cards. As such, the system(s) may communicate with the user's mobile phone to display the balances associated with each of the cards. Yet, in some instances, a wallet may include a display (e.g., the back side of the wallet) to present balances associated with each of the cards.

In another embodiment, a wallet may be misplaced, lost, and/or stolen. In such instances, the systems described herein may store a digital wallet with digital cards that corresponds to the physical wallet with the physical cards. For example, each of the digital cards may be a digital representation of a respective physical card. As such, the digital wallet may generate replacement digital cards that the user may use with the user's mobile phone on a temporary and/or a permanent basis, such as when the user's physical wallet may be missing or unavailable. As such, the systems herein solve specific problems involving the user being left without any instruments to make transactions as further described herein. Further, the system may generate respective tokens associated with the replacement digital cards and transmit the tokens to the user's mobile phone such that the user may securely conduct transactions using the replacement digital cards. In some instances, the tokens may be transmitted to various other user devices, such as the user's key fob, wearable devices (e.g., wrist watch devices), laptop devices, and/or vehicles (e.g., the user's car), among various other form factors. As such, the user may continue making transactions through the day and at different locations without having possession of the physical wallet.

The systems described herein improve various technologies associated with securing data for users. For example, some technologies may deactivate cards in a wallet based on detecting unauthorized uses of the cards and replacement cards may be created and sent to the card owner. As noted, the user is generally left without any alternate options to perform transactions until the replacement cards are received. Yet, the systems described herein provide a technically advantageous solution to users with misplaced, lost, or stolen wallets or cards. As herein, the systems may generate replacement digital cards that enable the user to continue making transactions with a mobile device, such as the user's mobile phone. Yet further, the systems may transmit tokens to the any other device a user may have, such that the user has the flexibility to snake secure transactions with virtually any mobile device available to the user.

FIG. 1A illustrates a system 100 associated with a number of wallets 104 and 106, according to an embodiment. The system 100 may be a payment provider system, such as PayPal, Inc. of San Jose, Calif, USA. As shown, the system 100 includes a cloud network 102. The cloud network 102 may be a secure network as further described herein. The cloud network 102 stores the digital wallet 104 that includes a number of digital cards 108, 110, and 112. In one example, the digital card 108 may be a digital credit card, the digital card 110 may be a digital debit card with a digital chip 114 such as a digital representation of an EMV chip as further described herein, and the digital card 112 may be a digital identification card with digital image data 116 of a user.

Further, the digital wallet 104 may correspond with or to the physical wallet 106. For example, the digital card 108 may correspond to the physical card 118, such as a physical credit card in a sleeve 119 of the wallet 106. The digital card 110 may correspond to the physical card 120, such as a physical debit card with a physical chip 124 (e.g., an EMV chip) in a sleeve 121 of the wallet 106. As noted, the digital chip 114 may also correspond to the physical chip 124. The digital card 112 may correspond to the physical card 122, such as an identification card in a sleeve 123 of the wallet 106. The digital image data 116 may also correspond to the physical image 126. Yet further, the system 100 and/or the cloud network 102 may communicate with the physical wallet 106 by exchanging data with the microcontroller 134 of the physical wallet 106.

In some embodiments, the system 100 may detect whether one or more of the cards 118, 120, and/or 122 are present in, absent from, or with a predefined proximity to (e.g., 3 feet away) the physical wallet 106. For example, the system 100 may communicate with the microcontroller 134 of the physical wallet 106 over the cloud network 102. The system 100 may also determine that the physical wallet 106 includes a number of physical cards, such as the physical cards 118, 120, and/or 122. In one example, the system 100 may determine that the physical wallet 106 includes the physical cards 118, 120, and/or 122 based on a communication with the microcontroller 134 of the physical wallet 106, In some instances, the system 100 may also compare the number of physical cards 118, 120, and/or 122 with the number of digital cards 108, 110, and 112 of the digital wallet 104 that corresponds the physical wallet 106.

In some instances, the system 100 may detect at least one physical card is missing from the physical wallet 106, such as the card 118. For example, the system 100 may detect that the physical card 118 is missing based on comparing the number of and/or information from physical cards 120 and 122 in the physical wallet 106 with the number of digital cards 108, 110, and/or 112 of the digital wallet 104. As such, the system 100 may transmit a notification to one or more user devices having access to the digital wallet 104, where the notification indicates that the physical card 118 is missing from the wallet, thereby alerting the user regarding the missing card 118. It should be noted that the system 100 may also detect whether the other physical cards 120 and/or 122 are missing from the physical wallet 106. Further, it should be noted that the microcontroller 134 may be configured to detect the missing card 118 and begin scanning for devices (e.g., the user's mobile phone) to transmit a notification to the user's mobile phone to alert the user.

It may also be noted that the system 100 may communicate with the microcontroller 134 based on the microcontroller 134 being detected by mobile devices, remote servers, and/or other wireless devices connected with the cloud network 102 as further described herein. Further, the microcontroller 134 may store data that indicates each of the cards 118, 120, and/or 122 stored in the physical wallet 106. The system 100 may also include a non-transitory memory and one or more hardware processors coupled to the non-transitory memory as further described herein. The processors may be configured to read instructions from the non-transitory memory to cause the system to perform the operations described herein.

In some embodiments, each of the number of physical cards 118, 120, and/or 122 may include a respective radio frequency identification (RFID) chip. As such, the system 100 may communicate with the microcontroller 134 to detect the respective RFID chips of the physical cards 118, 120, and/or 122. As such, the system 100 may compare the number and/or data from the RFID chips of physical cards 118, 120, and/or 122 with the number and/or data of digital cards 108, 110, and/or 112. As such, missing physical card 118 may be detected based on comparing the identifiers of the detected RFID chips with the corresponding identifiers stored with the number of digital cards 108, 110, and/or 112, thereby indicating the physical card 118 is missing when expected electronic data from an RFID chip or card is not found in the physical wallet.

In some embodiments, each of the number of physical cards 118, 120, and/or 122 may include a respective integrated circuit. Further, the physical wallet 106 may include respective detection sleeves 119, 121, and/or 123 configured to detect each of the number of physical cards 118, 120, and/or 122, such as respective integrated circuits (ICs) in the cards. For example, the detection sleeves 119, 121, and/or 123 may include capacitive sensors that may detect the respective ICs in the cards. As such, the physical wallet 106 may be detected to include the number of physical cards 118, 120, and/or 122 based on the respective detection sleeves 119, 121, and/or 123. In one example, each of the detection sleeves 119, 121, and/or 123 may include a respective EMV and/or magnetic stripe reader, such that each of the physical cards 118, 120, and/or 122 may be detected. In some instances, each of the detection sleeves 119, 121, and/or 123 may read the EMV chips and magnetic stripes of the physical cards 118, 120, and/or 122. Further, the microcontroller 134 may identify the physical cards 118, 120, and/or 122 using the respective detection sleeves 119, 121, and/or 123, and also communicate with the cloud network 102 via near field communication (NFC), BLUETOOTH®, and/or WIFI, among other wireless interfaces contemplated herein.

In some embodiments, the system 100 may determine a physical card, such as the physical card 118, is inserted into the detection sleeve 119 of the physical wallet 106. For example, the card 118 may be determined based on the system 100 communicating with the microcontroller 134. The system 100 may also determine one or more balances based on the physical card 118 being inserted into the detection sleeve 119. In some instances, the system 100 may also cause one or more user devices to display the one or more balances. For example, the system 100 may communicate with the user's mobile phone to display a remaining balance of the credit card 118 on the mobile phone. In another example, the system 100 may determine outstanding balances (e.g., amounts due), available credit balances, and amounts saved, among other forms of data associated with the cards 118, 120, and/or 122. Further, the system 100 may communicate with the mobile phone to display such data. In some instances, the physical wallet 106 may include a graphic display on the back side of the wallet 106 configured to display such data.

In some embodiments, the system 100 may determine the physical cards 118, 120, and/or 122 are inserted into and/or held by the detection sleeves 119, 121, and/or 123 of the physical wallet 106, respectively. For example, the system 100 may determine the physical cards 118, 120, and/or 122 are inserted based on communication with the microcontroller 134 of the physical wallet 106. In some instances, the system 100 may update the digital wallet 104 with one or more of the digital cards 108, 110, and/or 112 that corresponds to the inserted physical cards 118, 120, and/or 122. As such, the one or more user devices may be configured to perform transactions with the one or more digital cards 108, 110, and/or 112. In one example, the detection sleeves 119, 121, and/or 123 may include respective card readers (e.g., a magnetic stripe reader, an EMV chip reader, and an RFID reader) configured to detect and/or read the physical cards 118, 120, and/or 122, respectively. In one scenario, based on detecting the physical cards 118, 120, and/or 122, the microcontroller 134 may encrypt the data read from the cards and transmit the encrypted data to the digital wallet 104 in the cloud network 102.

In some embodiments, the system 100 may determine one or more digital cards 108, 110, and/or 112 are added to the digital wallet 104. For example, the system 100 may determine the digital card 108 is added to the digital wallet 104 based on a user input via the user's mobile phone. In some instances, the system 100 may establish the communication with the microcontroller 134 of the physical wallet 106 based on the digital card 108 being added to the digital wallet 104. In some instances, the system 100 may detect the physical card 118 is missing based on comparing the number of physical cards 120 and 122 in the physical wallet 106 with the number of digital cards 108, 110, and 112 added to the digital wallet 104. In some instances, the system 100 may transmit a notification to the user's mobile phone to remind the user to place the physical card 118 in the sleeve 119 of the physical wallet 106.

As noted, the one or more user devices described herein may include a mobile device, such as the user's mobile phone. In one such example, the physical wallet 106 may take the form of a phone case of the mobile phone. In some instances, the system 100 may cause the mobile phone to display real-time transactional data, such as the account balances described herein. For example, the mobile phone may display the respective balances of the physical cards 118 and/or 120 as described herein.

Figure 1B:
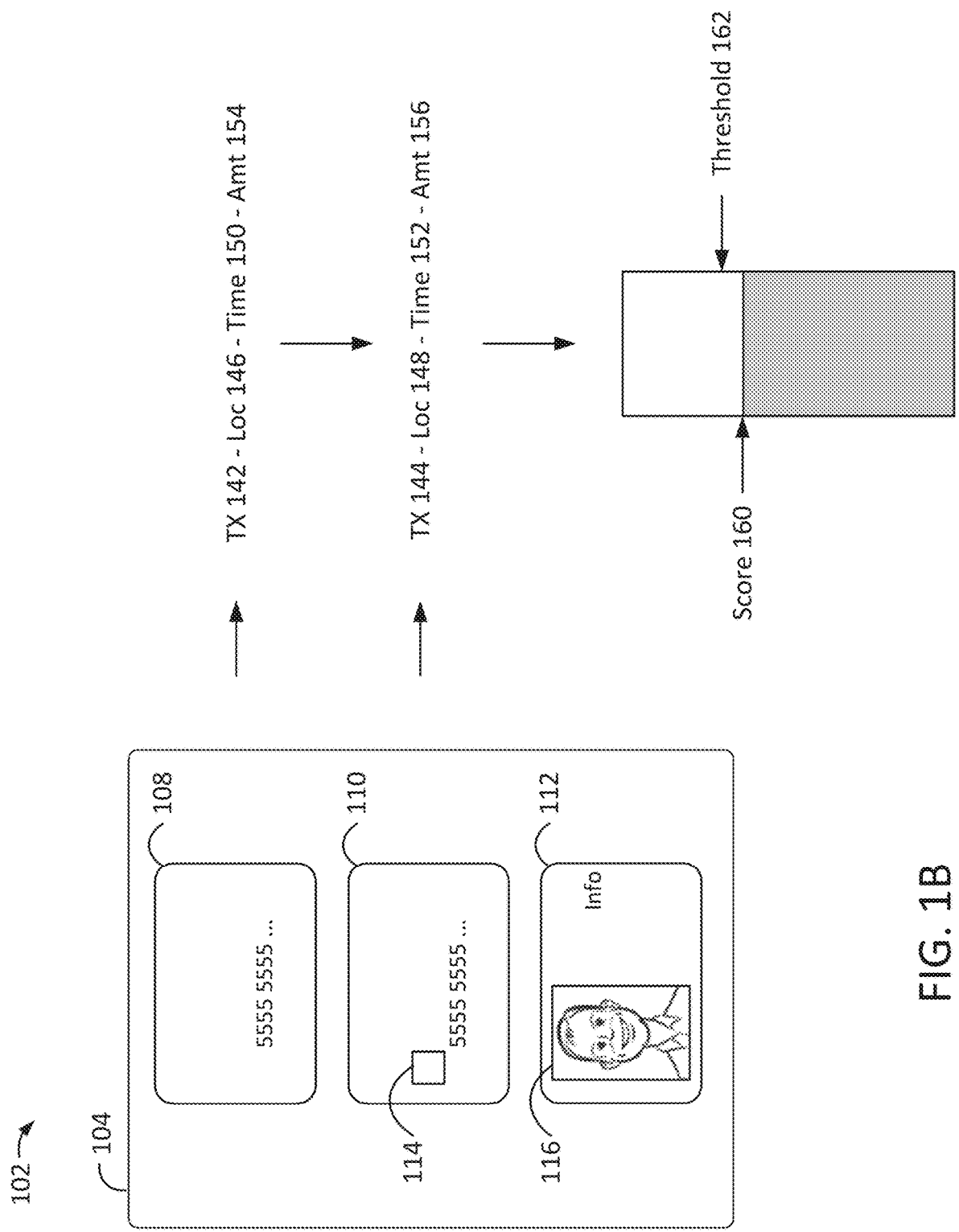
FIG. 1B illustrates a cloud network associated with a score, according to an embodiment.

FIG. 1B illustrates the cloud network 102, according to an embodiment. As shown, the cloud network 102 includes the digital wallet 104 and the digital cards 108, 110, and 112. The digital card 110 includes the digital chip 114 that corresponds to the physical chip 124. The digital card 112 includes the digital image data 116 that corresponds to the physical image 126.

In one example, the digital card 108 corresponds to a transaction 142 at a given location 146, at a time 150, and for an amount 154. For example, the transaction 142 may correspond to the physical card 118 being used at the store location 146, at the time 150, and for the amount 154. In particular, the magnetic stripe of the physical card 118 may be read by a point-of-sale (POS) device at the store location 146 to perform the transaction 142. Further, use of the digital card 110 corresponds to a transaction 144 at a given location 148, at a time 152, and for an amount 156. For example, the transaction 144 may correspond to the physical card 120 being used at the store location 148, at the time 150, and for the amount 154. In particular, the physical chip 124, such as an EMV chip, may be read by a POS device at the store location 148 to perform the transaction 144.

In some embodiments, the system 100 may determine a friction score 160. In some instances, the friction score 160 may be calculated based on the location 146, the time 150, and the amount 154 of the transaction 142. For example, the friction score 160 may increase based on the location 146 being outside one or more user zones, such as geographic zones (e.g, counties, cities, and/or states) associated with the user and/or the user's account (e.g., the user's address). In one scenario where the user resides in San Francisco, CA and the location 146 corresponds to Portland, Oreg, the friction score 160 may increase proportionally to the distance between the two locations. Further, the friction score 160 may also be calculated based on the location 148, the time 152, and the amount 156 of the transaction 144. In another example, the friction score 160 may increase based on the location 148 being in Vancouver, Canada, which may indicate unexpected locations of the transactions 142 and 144 based on the user's prior account activities.

In some embodiments, the friction score 160 may be compared to a deactivation threshold 162. The deactivation threshold 162 may be determined based on information included associated with the user's account, such as user specified limitations and restrictions, past approved transactions, and past denied transactions. Such information or data can be used to build a profile user profile, with different factors, such as amount, location, time of day, store type, and purchase type, provided specific weighting.

In some embodiments, a friction score is computed based on one or more payment details, an authentication usage, and a proximity to other personal items. In some embodiments, a friction score is computed based on a transaction consistency score, an authentication consistency score, and a proximity consistency score. These scores and usage data may be taken into account by a machine learning algorithm to indicating whether the friction level is high, low, or medium. The friction level can then be compared with user-defined threshold levels and processed using a policy/decision engine. Based on these calculations, one or more actions may be taken, for example, allowing a transaction to go through, lowering the limits, restricting card usage, and de-activating a card.

The friction score 160 exceeding the deactivation profile may then indicate a likely fraudulent transaction, resulting in deactivation of the associated funding card. The deactivation threshold 162 may be modified based on one or more balances of the user account, such that the threshold 162 may be lowered based on the one or more balances meeting a balance limit. In one example, the user may determine and/or set the deactivation threshold 162 to a given number. As such, under various circumstances, the friction score 160 may meet or exceed a deactivation threshold 162 based on detecting at least one missing card from the physical cards 118, 120, and/or 122 from the physical wallet 106. In the scenario described above where the transactions 142 and/or 144 have been identified as unexpected transactions, the system 100 may deactivate the physical cards 118 and/or 120 and the corresponding digital cards 108 and/or 110.

In one example, the transactions 142 and 144 may reflect unexpected or erratic transactions outside of one or more transactional patterns stored with the user's account. In some instances, the unexpected transactions 142 and 144 may elevate unauthorized transaction risks, stolen card risks, and/or various related exposures. In such instances, further transactions may be challenged or further scrutinized, such that the physical cards 118 and/or 120 must be authenticated with biometric data stored with the service provider or the cloud network 102. In some instances, where further transactions with the physical cards 118 and/or 120 cannot be authenticated with biometric data, the system 100 may deactivate the missing physical cards 118 and/or 120, such as by notifying the respective card issuers.

Figure 1C:
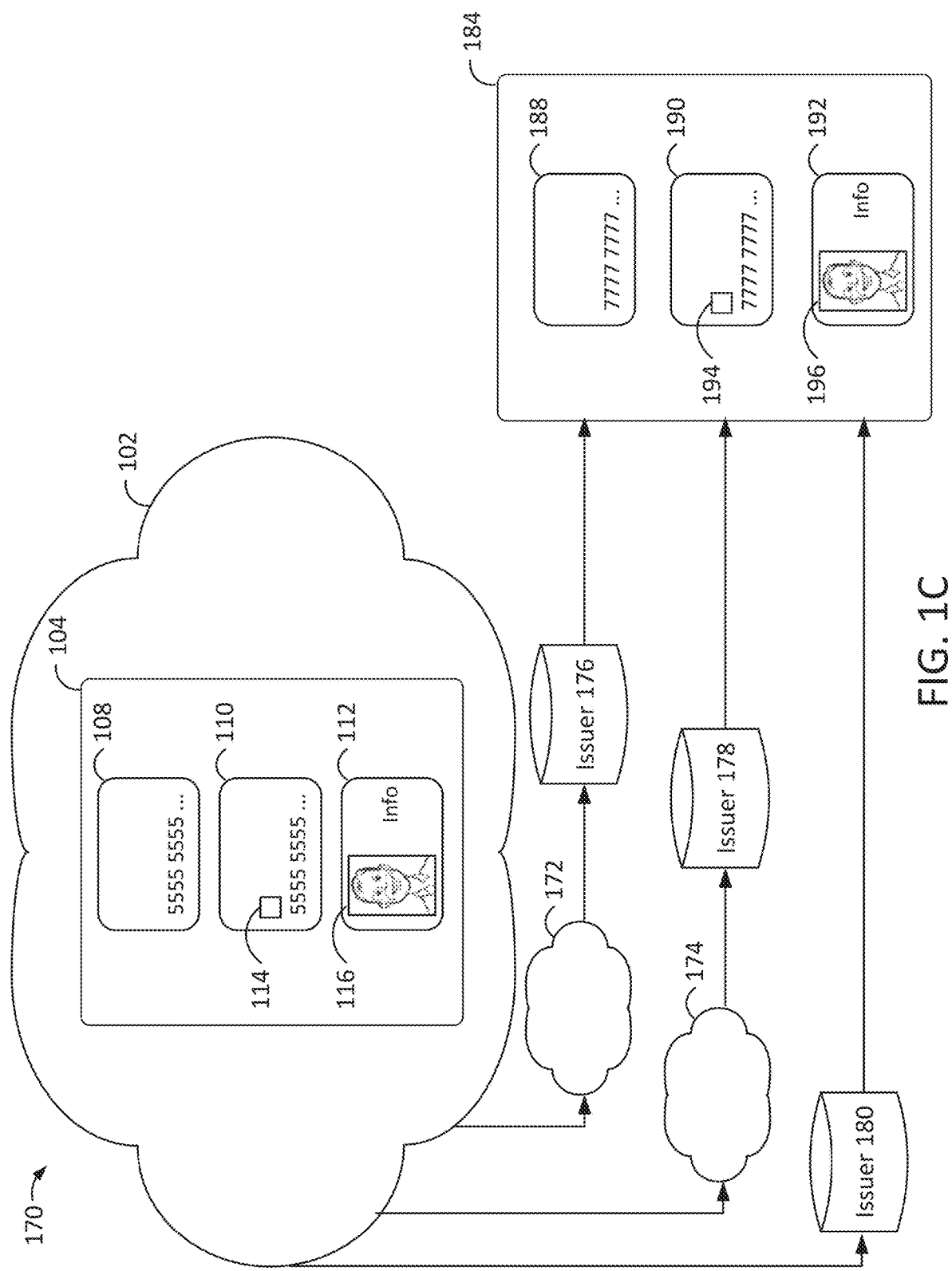
FIG. 1C illustrates a system associated with a number of issuers, according to an embodiment.

FIG. 1C illustrates a system 170 associated with a number of issuers 176, 178, and/or 180, according to an embodiment. The system 170 may include the system 100 described herein, such as the payment provider system as described above. In one example, based on deactivating one or more of the physical cards 118 and/or 120, and/or expiring the physical card 122, the system 170 may request replacement physical cards 188, 190, and/or 192 for a replacement physical wallet 184.

In one example, where the physical card 118 is deactivated, the system 170 may communicate with a network 172 (e.g., a VISA® computer network or rails) to cause the issuer 176 (e.g., JPMORGAN CHASE™) to provide the replacement physical card 188. Further, where the physical card 120 is deactivated, the system 170 may communicate with a network 174 (e.g., a MASTERCARD™ computer network or rails) to cause the issuer 176 (e.g., BANK OF AMERICA™) to provide the replacement physical card 190 with the physical chip 194 possibly similar to the physical chip 124. It should also be noted that the system 170 may communicate with the issuers 176 and 178 to request the replacement physical cards 188 and 190 as well. Yet further, where the physical card 122 is expired, the system 170 may communicate with the issuer 180 (e.g., the Department of Motor Vehicles) to provide a replacement physical card 196 with the physical image 196 taking the form of the physical image 126.

Figure 2:
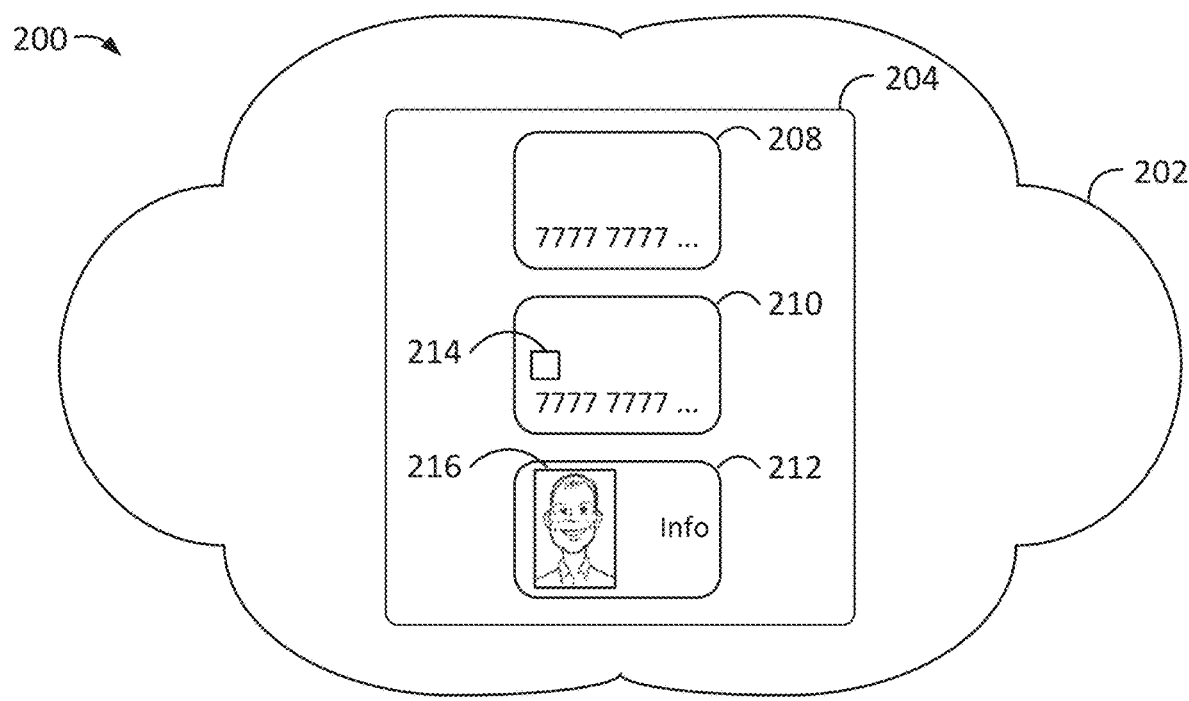
FIG. 2 illustrates a system associated with a replacement digital wallet, according to an embodiment.
Figure 2:
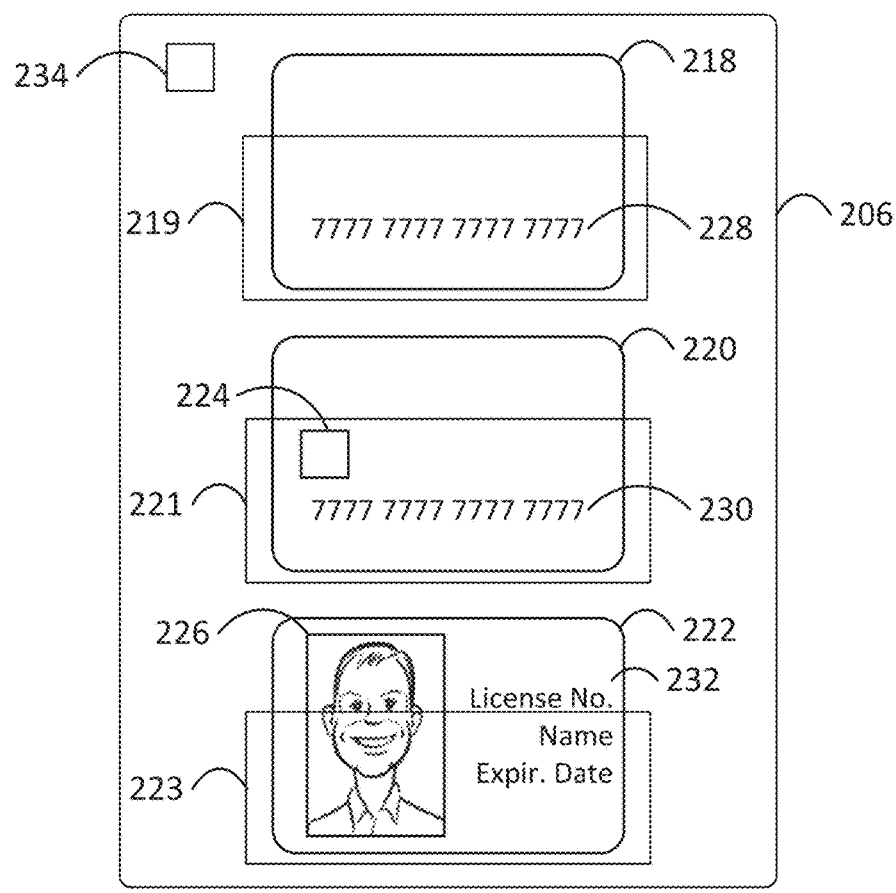

FIG. 2 illustrates a system 200 associated with a replacement digital wallet 206, according to an embodiment. The system 200 may include the system 100 and/or 170 as described herein. For example, the system 200 may include the cloud network 202 that takes the form of the cloud network 102 described above. As shown, the cloud network 202 may include the replacement digital wallet 204 that corresponds to the replacement physical wallet 206, where the digital wallet 206 may be generated based on the wallet 206 being issued for the user. For example, the replacement physical wallet 206 may correspond to the replacement physical wallet 184 described above, possibly where the wallet 206 takes the form of the wallet 184.

In one example, the replacement digital wallet 204 may be generated with the replacement digital card 208, the replacement digital card 210 with the digital chip 214, and the replacement digital card 212 with the digital image data 216. The digital cards 208, 210, and 212 may correspond with or to the replacement physical cards 218, 220, and/or 222, where the card 218 may be read by the detection sleeve 219, the card 220 (e.g., the physical chip 224) may be read by the detection sleeve 221, and the card 222 may be detected by the detection sleeve 223. In one example, the system 200 may generate the digital wallet 204 based on communicating with the microcontroller 234 that takes the form of the microcontroller 134 described further herein.

Figure 3A:
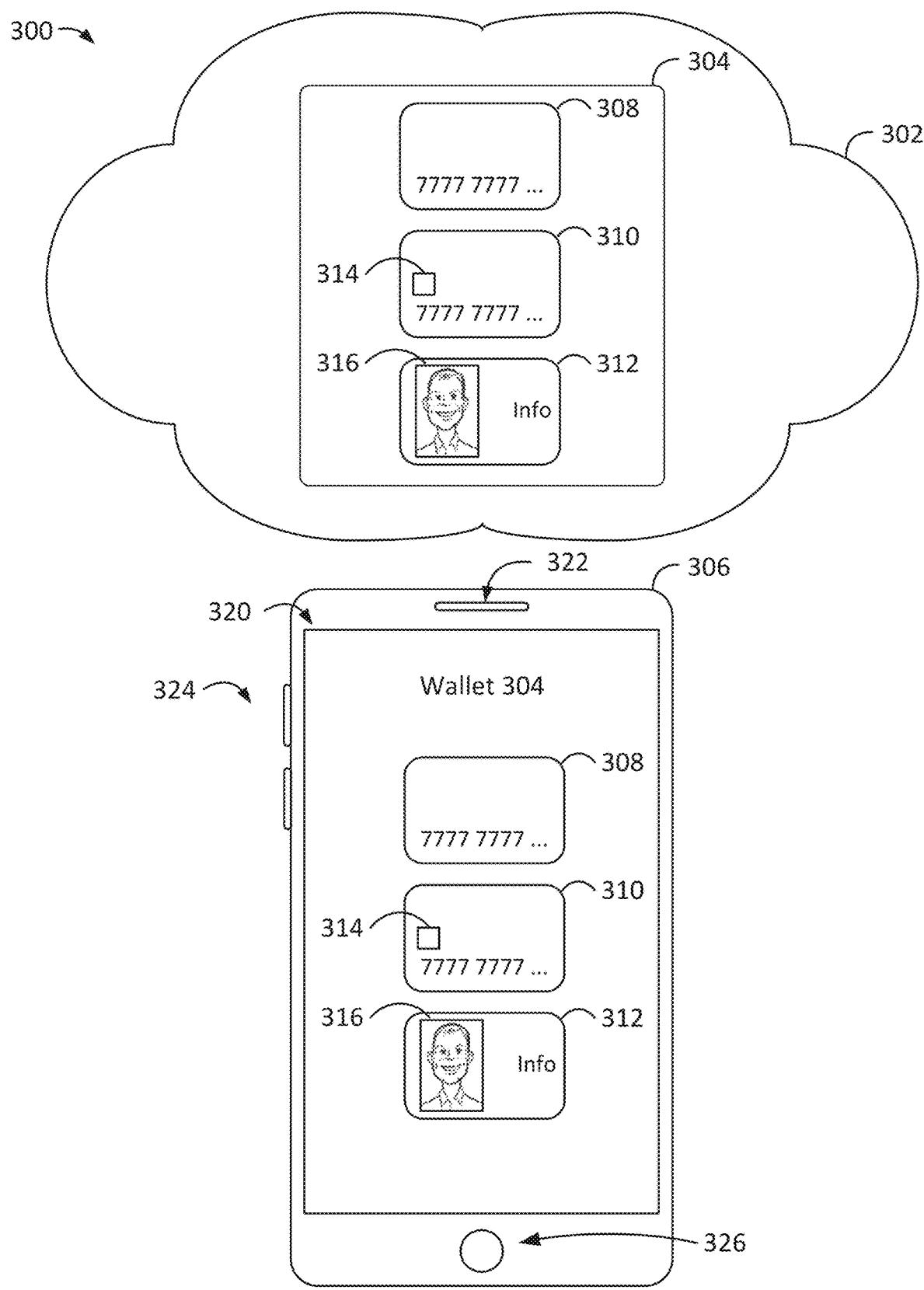
FIG. 3A illustrates a system associated with a digital wallet, according to an embodiment.

FIG. 3A illustrates a system 300 associated with a digital wallet 304, according to an embodiment. The system 300 may include the systems 100, 170, and/or 200 as described herein. As shown, the system 300 includes a cloud network 302. The cloud network 302 stores the digital wallet 304 that includes a number of digital cards 308, 310, and 312; the digital wallet 304 may take the form of the replacement digital wallet 204 that includes the replacement digital cards 208, 210, and 212 as described above. In one example, the digital card 308 may be a digital credit card, the digital card 310 may be a digital debit card with a digital chip 314 such as a digital EMV chip as further described herein, and the digital card 312 may be a digital identification card with digital image data 316 of the user.

In some embodiments, the digital wallet 304 may be accessible by one or more user devices, such as the mobile device 306 (e.g., the user's mobile phone, smartphone, and/or wearable device). As shown, the mobile device 306 includes a touch-sense display 320, a speaker 322, side buttons 324, and a front button 326 with a biometric sensor (e.g., a finger-print sensor). The display 320 may present the digital wallet 304, the digital card 308, the digital card 310 with the digital chip 314, and the digital card 312 with image data 316.

In some embodiments, a distance between a wallet location and a user location may be detected. For example, referring back to FIG. 1A, the system 100 may detect the distance between the location of the physical wallet 106 and the user location, where the user location may be approximated based on the location of the user's mobile devices (e.g., using the global positioning system (UPS) component in the user's mobile phone). Considering the scenarios above where the wallet location may be Vancouver, Canada and the user location may be San Francisco, the distance may exceed one or more threshold distances. As such, the system 100 may deactivate one or more wallet cards 108-112 and/or 118-122 based on the detected distance exceeding a threshold. Further, the system 100 may communicate with one or more issuers 176, 178, and/or 180 through one or more networks 172 and/or 174, such as to issue one or more replacement cards 188, 190, and/or 192 based on the one or more deactivated wallet cards 108-112 and/or 118-122.

In some embodiments, the system 100 may also notify and/or alert the user regarding the deactivated wallet cards and/or the replacement cards. For example, referring back to FIG. 3A, the system 300 may communicate with the user's mobile device 306. In some instances, the system 300 may cause the mobile device 306, and possibly other user devices (e.g., wearable devices), to display the replacement digital wallet 304 with one or more replacement digital cards 308, 310, and/or 312 based on deactivating the one or more wallet cards, such as the cards 108-112 and/or 118-122 described herein. As noted, the one or more replacement digital cards 308, 310, and/or 312 may correspond to the one or more replacement physical cards, such as the cards 118, 120, and/or 122 described herein.

As noted, in some instances, the system 300 may generate the replacement digital wallet 304 based on the one or more replacement cards, such as the replacement physical cards 218, 220, and/or 222 described herein. Further, the system 300 may detect that a physical card is added to the replacement physical wallet 206. For example, the physical card 222 may be added to the physical wallet 206. In such instances, the system 300 may update the replacement digital wallet 304 to include a digital card 312 that corresponds to the card 222 added to the replacement physical wallet 206.

Figure 3B:
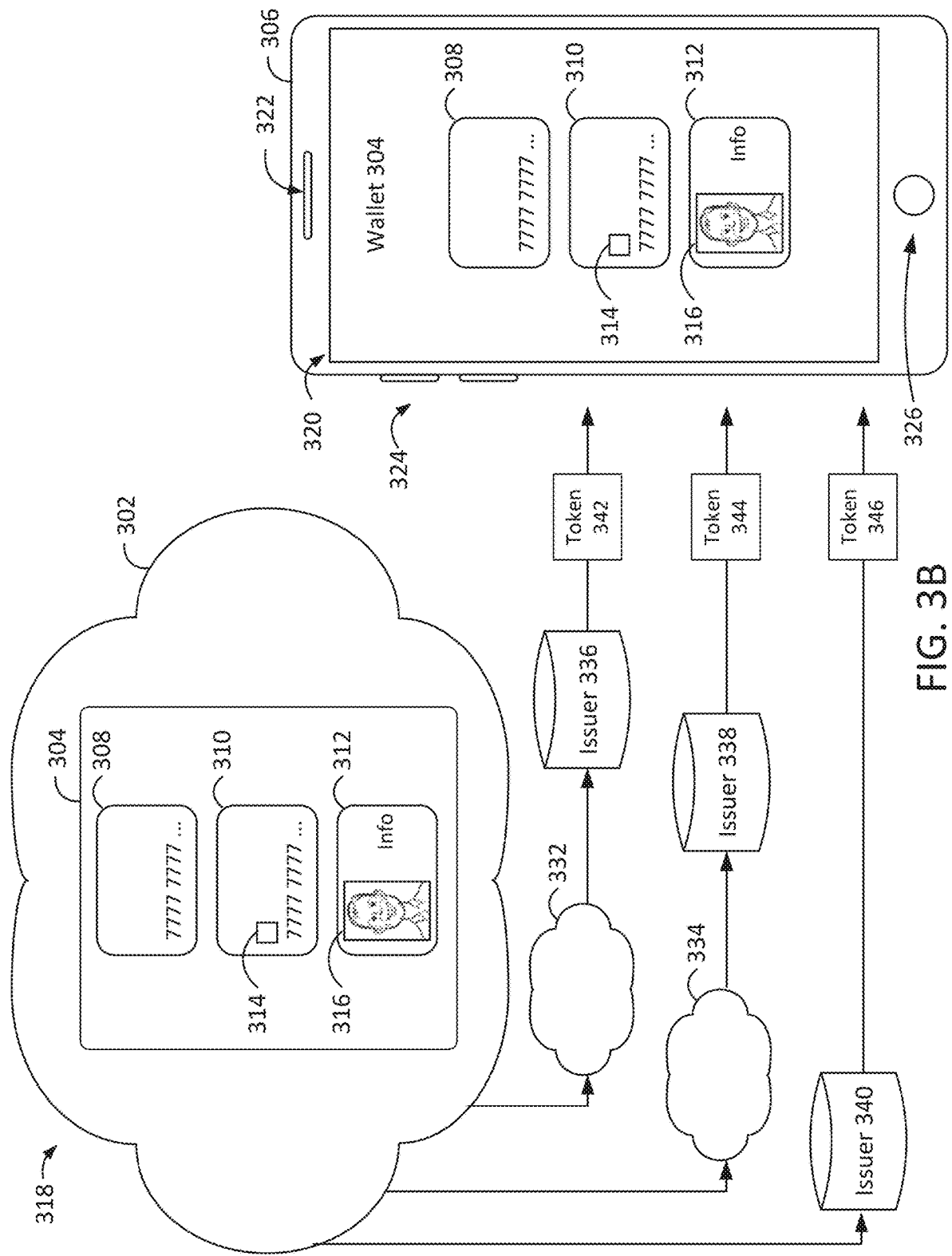
FIG. 3B illustrates a system associated with a number of tokens, according to an embodiment.

FIG. 3B illustrates a system 318 associated with a number of tokens 342, 344, and 346, according to an embodiment. The system 318 may include the system 300, such as the payment provider system as described above. In one example, based on the replacement digital cards 308, 310, and/or 312, the system 318 may request tokens 342 and/or 334 from the networks 332 and/or 334, respectively, Yet, in another example, the system 318 may request tokens 342, 344, and/or 346 from the issuers 336, 338, and/or 334, respectively. Notably, the networks 332 and/or 334 may be the networks 172 and/or 174, and further, the issuers 336, 338, and/or 334 may be the issuers 176, 178, and/or 180 as described herein.

In one example, the system 300 may request one or more tokens 342, 344, and/or 346 through a communication with the one or more networks 332, 334, and the issuer 340. As shown, the tokens 342, 344, and/or 346 may correspond to the replacement digital cards 308, 310, and/or 312. Notably, the tokens 342 and/or 344 may be payment tokens that may enable the mobile device 306 to perform transactions with a merchant device (e.g., a POS device). As such, the mobile device 306 may perform the transactions with the replacement digital wallet 304. For example, the tokens 342 and/or 344 may be used with the user's fingerprint scanned by the button 326 (e.g., a biometric sensor) to complete the transactions. The token 346 may be an identity or authentication token that may be used to authenticate the transactions with the mobile device 306 and/or the digital wallet 304. In one example, the token 346 may be used to authenticate the transactions in lieu of using the user's fingerprint.

In various instances, the tokens 342, 344, and/or 346 may be used as substitute data elements in place of sensitive data elements, thereby securing the sensitive data elements. In some instances, the tokens 342, 344, and/or 346 may take the form of unique identifiers that may not be mathematically reversible, various types of bar codes (e.g., quick response (QR) codes), and/or other codes. Various other codes may include nested structures with transaction identifiers, payment network identifiers, and tokenization data (e.g., a signature, a header, encrypted payment data, an amount, a cardholder name, and/or payment processing data).

In one example, the system 300 may request one or more tokens 342, 344, and/or 346 through a communication with the one or more networks 332, 334, and the issuer 340. In some instances, communicating with the one or more networks 332, 334, and the issuer 340 may cause the one or more issuers 336, 338, and/or 340 to provide the one or more replacement cards, such as the replacement physical cards 218, 220, and/or 222 described herein. As noted, the replacement physical cards 218, 220, and/or 222 may be issued in response to deactivating the initial physical cards, such as the physical cards 118, 120, and/or 122.

Figure 3C:
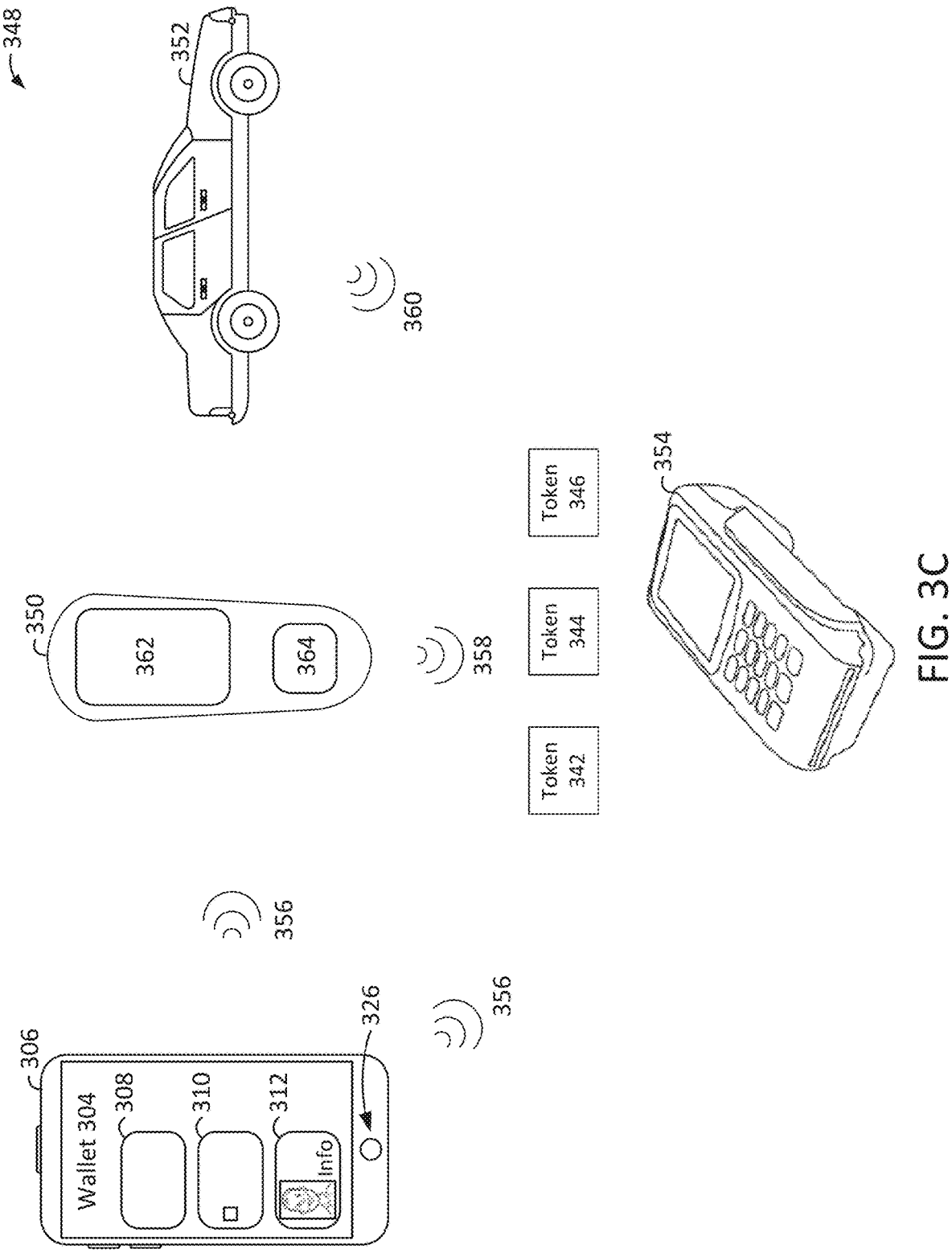
FIG. 3C illustrates a system associated with a number of devices, according to an embodiment.

FIG. 3C illustrates a system 348 associated with a number of devices 306, 350, 352, and/or 354, according to an embodiment. The system 348 may include the systems 300 and/or 318, such as the payment provider system as described above. The device 306 may be a mobile device, such as the user's mobile phone described herein. The device 350 may be a fob device, such as a key fob device with a display 362 and a fingerprint sensor 364. The device 352 may be a vehicle, such as an electric vehicle.

In some embodiments, the system 348 may transmit the one or more tokens 342, 344, and/or 346 to one or more user devices, such as the devices 306, 350, and/or 352. The one or more tokens 342, 344, and/or 346 may enable the one or more user devices 306, 350, and/or 352 to perform transactions using the one or more replacement cards 308, 310, and/or 312, respectively. In one example, the device 306 may transmit one or more of the tokens 342, 344, and/or 346 via the wireless signals 356 to the POS device 354 to perform a transaction. The device 350 may transmit one or more of the tokens 342, 344, and/or 346 based on the device 350 receiving fingerprint data through the fingerprint sensor 364. One or more of the tokens 342, 344, and/or 346 may be transmitted via the wireless signals 358 to the POS device 354 to perform a transaction. The device 352 may transmit one or more of the tokens 342, 344, and/or 346 via the wireless signals 360 to the POS device 354 to perform a transaction. Notably, a non-transitory machine-readable medium having stored thereon machine-readable instructions may be executable to cause the system 348 to perform the operations described herein.

In practice, the mobile device 306 may transmit the tokens 342, 344, and/or 346 to each of the devices 350 and/or 352 through the wireless signals 356. As such, the devices 350 and/or 352 may be used to transmit the tokens 342, 344, and/or 346 to perform transactions. Notably, in the scenario where a user loses a physical wallet (e.g., the physical wallet 106), the user may use multiple devices 306, 350, and/or 352 with varying forms to perform transactions with the tokens 342, 344, and/or 346. As such, the user may effectively continue normal activities throughout a given day without the physical wallet 106.

In some embodiments, referring back to FIG. 1B, the replacement digital cards 308, 310, and/or 312 may correspond to the physical cards 118, 120, and/or 122. As such, the system 348 may determine transaction data 142 and/or 144 associated with the one or more wallet cards 118, 120, and/or 122. As noted, the transaction data 142 and/or 144 may include location data 146 and/or 148 that indicates the wallet location is outside of one or more geographic zones (e.g., a zone with a given radius around the user location).

In some instances, the system 348 may determine the friction score 160 meets or exceeds a deactivation threshold 162 based on the wallet location being outside of one or more geographic zones. As such, the system 348 may deactivate the one or more wallet cards 118, 120, and/or 122 based on the friction score 160 that meets or exceeds the deactivation threshold 162.

In relation to the scenarios above, the system 348 may determine first transaction data 142 associated with a first card 118 of the one or more wallet cards 118, 120, and/or 122, where the first transaction data 142 includes first location data 146, first time data 150, and first amount data 154. The system 348 may also determine second transaction data 144 associated with a second card 120 of the one or more wallet cards 118, 120, and/or 122. The second transaction data 144 may include second location data 148, second time data 152, and second amount data 156. The system 348 may also determine the friction score 160 meets or exceeds the deactivation threshold 162 based on the first location data 146, the first time data 150, the first amount data 154, the second location data 148, the second time data 152, and the second amount data 156. As such, the one or more wallet cards 118, 120, and/or 122 may be deactivated or suspended based on the friction score 160 that meets or exceeds the deactivation threshold 162.

Figure 4:
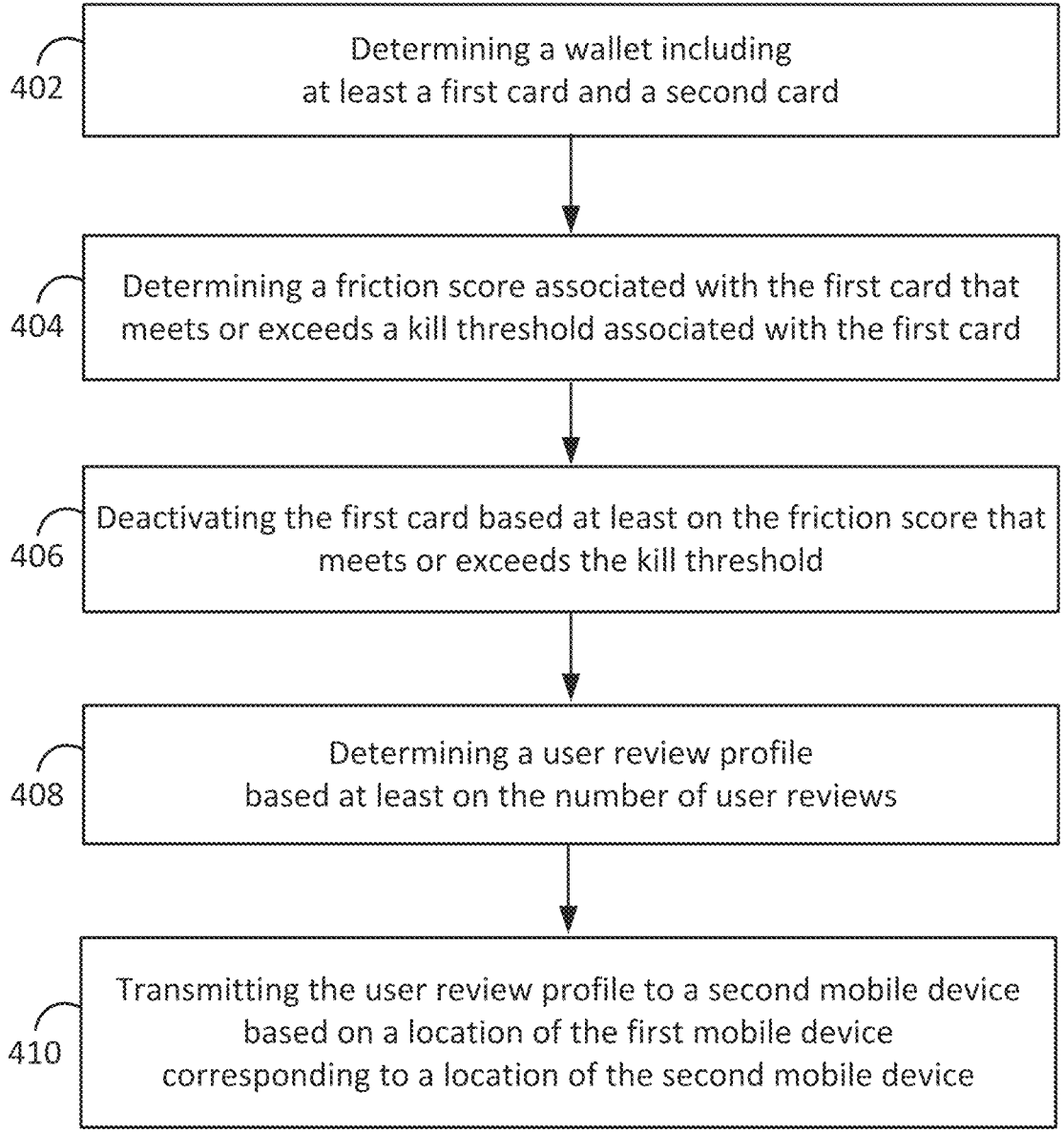
FIG. 4 illustrates an exemplary method, according to an embodiment.

FIG. 4 illustrates an exemplary method 400, according to an embodiment. One or more steps of the method 400 described herein may be omitted, performed in a different sequence, and/or combined with other methods for various types of scenarios contemplated herein.

At step 402, the method 500 may include accessing information associated with a wallet including at least a first card and a second card. For example, referring back to FIG. 1A, the wallet 106 may be determined to include the first card 118 and the second card 120.

At step 404, the method 400 may include determining that a friction score associated with the first card meets or exceeds a deactivation threshold associated with the first card. For example, referring back to FIG. 1B, the friction score 160 associated with the first card 118 may meet or exceed the deactivation threshold 162 associated with the first card 118.

At step 406, the method 400 may include deactivating the first card based on the friction score that meets or exceeds the deactivation threshold. For example, the first card 118 may be deactivated based on determining the friction score 160 meets or exceeds the deactivation threshold 162.

At step 408, the method may include causing a first replacement card to be activated in response to deactivating the first card. For example, the first replacement card 188 may be activated based on deactivating the first card 118.

FIGS. 5A-D illustrate a number of deactivated cards 508, 510, and/or 512, according to an embodiment. As shown, the cards 508, 510, and/or 512 of the wallet 504 may correspond to the cards 118, 120, and/or 122, respectively. The physical chip 514 may take the form of the physical chip 124 and the physical image 516 takes the form of the physical image 126.

As shown in FIG. 5A, the first card 508 may be deactivated and the first replacement card 528 may be activated. In another example, referring back to FIG. 4, step 406 of the method 400 may include deactivating the first card 508 based on a determination that the friction score 160 meets or exceeds the deactivation threshold 162. Further, at step 408, the method 400 may include causing a first replacement card 528 to be activated based on deactivating the first card 508.

As shown in FIG. 5B, the second card 510 may be deactivated and the second replacement card 530 may be activated. In another example, the method 400 may include determining that a second friction score associated with the second card 510 meets or exceeds a second deactivation threshold associated with the second card 510. The method 400 may also include deactivating the second card 510 based on the second friction score that meets or exceeds the second deactivation threshold. The method 400 may also include causing the second replacement card 530 to be activated responsive to deactivating the second card 510.

As shown in FIG. 5C, the identification card 512 may be deactivated and the replacement identification card 532 may be activated. In some embodiments, referring to the method 400, the wallet 504 may also include an identification card 512. Thus, the method 400 may include determining a third friction score associated with the identification card 512 that meets or exceeds a third deactivation threshold associated with the identification card 512. As such, the method 400 may cause the identification card 512 to deactivate or expire based on the third friction score that meets or exceeds the third deactivation threshold. As shown in FIG. 5B, the method 400 may also cause a replacement identification card 532 to be activated in response to causing the identification card 512 to expire.

As shown in FIG. 5D, the activation graph 531 illustrates a deactivation line 534 and an activation line 544. As shown, the deactivation time 538 of the card 508 occurs approximately simultaneously with the activation time 540 of the card 528. The deactivation time 542 of the card 510 occurs approximately simultaneously with the activation time 546 of the card 530. The time 548 of deactivating the card 512 occurs approximately simultaneously with activating the card 532.

In some embodiments, referring back to FIG. 4, the method 400 may include generating one or more tokens 342, 344, and/or 346 associated with the first replacement card 188, the second replacement card 190, and the third replacement card 192, respectively. The method 400 may also include transmitting the one or more tokens 342, 344, and/or 346 to a user device, such as the device 306. The user device 306 may be configured to perform one or more transactions with the first replacement card 188, the second replacement card 190, and/or the third replacement card 192 based on the one or more tokens 342, 344, and/or 346.

In some embodiments, the method 400 may include authenticating the one or more transactions with the first replacement card 188, the second replacement card 190, and/or the third replacement card 192 based on the one or more tokens 342, 344, and/or 346. The method 400 may also include updating the friction score 160 associated with the first replacement card 188 based on authenticating the one or more transactions.

Figure 6:
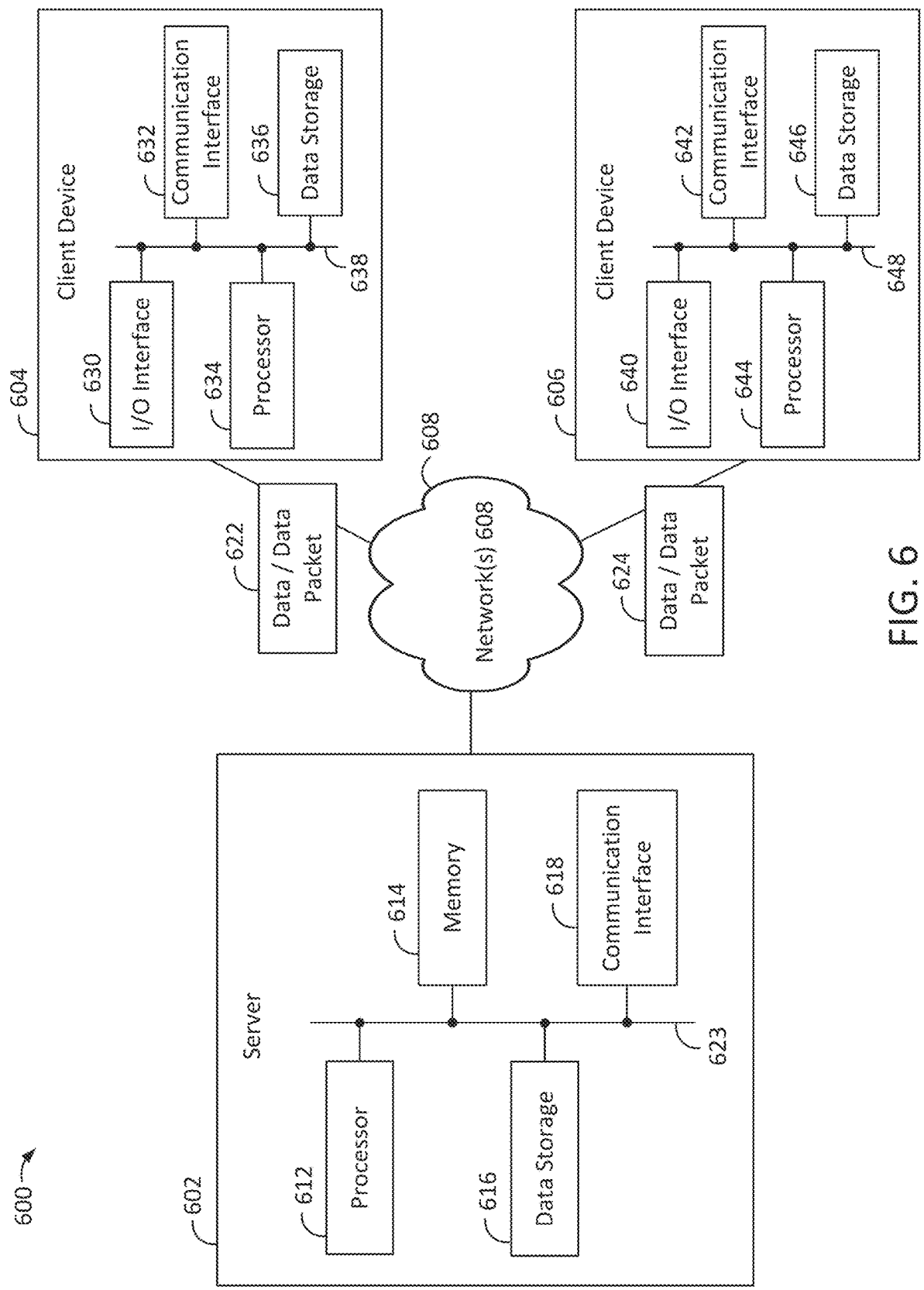
FIG. 6 is a block diagram of an exemplary system, according to an embodiment.

FIG. 6 is a simplified block diagram of an exemplary system 600, according to an embodiment. As shown, the system 600 may include a server 602. The server 602 may be configured to perform operations of a service provider system, such as PayPal, Inc. of San Jose, Calif, USA. Further, the system 600 may also include a client device 604 and a client device 606, where the client device 604 may take the form of the microcontroller device 234 and the client device 606 may take the form of the mobile device 306. As such, the server 602 and the client devices 604 and 606 may be configured to communicate over the one or more communication networks 608. As shown, the system 600 includes multiple computing devices 602, 604, and/or 606, among other possible devices.

The system 600 may operate with more or less devices than the computing devices 602, 604, and/or 606 shown in FIG. 6, where each device may be configured to communicate over the one or more communication networks 608, possibly to transfer data from one device to another. The one or more communication networks 608 may include a packet-switched network configured to provide digital networking communications and/or exchange data of various forms, contents, types, and/or structures. In some instances, the one or more communication networks 608 may include a data network, a private network, a local area network, a wide area network, a telecommunications network, and/or a cellular network, among other possible networks. In some instances, the communication network 608 may include network nodes, web servers, base stations, microcells, switches, routers, and/or various buffers/queues to transfer data/data packets 622 and/or 624.

The data/data packets 622 and/or 624 may include the various forms of data, such as detection data that indicates the physical cards 118, 120, and/or 122 in the detection sleeves 119, 121, and/or 123, respectively. The data/data packets 622 and/or 624 may be transferrable using communication protocols such as packet layer protocols, packet ensemble layer protocols, and/or network layer protocols, among other types of communication protocols. For example, the data/data packets 622 and/or 624 may be transferrable using transmission control protocols and/or internet protocols (TCP/IP). In various embodiments, each of the data/data packets 622 and 624 may be assembled or disassembled into larger or smaller packets of varying capacities, such as capacities varying from 6,000 to 6,600 bytes, for example, among other possible data capacities. As such, data/data packets 622 and/or 624 may be transferrable over the one or more networks 608 and to various locations in the one or more networks 608.

In some embodiments, the server 602 may take a variety of forms. The server 602 may be an enterprise server, possibly operable with one or more operating systems to facilitate the scalability of the architecture within the system 600. For example, the server 602 may operate with a UNIX-based operating system configured to integrate with a growing number of other servers in the one or more networks 608, the client devices 604 and/or 606, among other computing devices configured to communicate with the system 600. The server 602 may further facilitate workloads for performing numerous data transfers with the client devices 604 and/or 606. In particular, the server 602 may facilitate the scalability relative to an increasing number of data transfers to improve and/or eliminate data congestion, bottlenecks, and/or data transfer delays.

In some embodiments, the server 602 may include multiple components, such as one or more hardware processors 612, non-transitory memories 614, non-transitory data storages 616, and/or communication interfaces 618, among other possible components described in relation to FIG. 6, any of which may be communicatively linked via a system bus, network, or other connection mechanism 623. The one or more hardware processors 612 may take the form of a multi-purpose processor, a microprocessor, a special purpose processor, a digital signal processor (DSP) and/or other types of processing components. For example, the one or more hardware processors 612 may include an application specific integrated circuit (ASIC), a programmable system-on-chip (SOC), and/or a field-programmable gate array (FPGA). In particular, the one or more hardware processors 612 may include a variable-bit (e.g., 64-bit) processor architecture configured to transfer the data packets 622 and/or 624. As such, the one or more hardware processors 612 may execute varying instructions sets (e.g., simplified and complex instructions sets) with fewer cycles per instruction than other general-purpose hardware processors, thereby improving the performance of the server 602. Thus, the server 602 improves existing technical fields or server architectures/technologies as further described herein.

In practice, the one or more hardware processors 612 may be configured to read instructions from the non-transitory memory component 614 to cause the system 600 to perform operations. The system 600, including the server 602, may detect the physical wallet 604 includes a number of physical cards, such as the physical cards 118, 120, and/or 122, among other possible cards. In one example, the system 600 may detect the physical wallet 604 includes the physical cards 118, 120, and/or 122 based on the communication with the microcontroller 634 of the physical wallet 604. For example, the communication may involve the server 602 exchanging data and/or data packets 622 with the microcontroller 634. In some instances, the system 100 may also compare the number of physical cards 118, 120, and/or 122 with the number of digital cards 108, 110, and 112 of the digital wallet 104 that corresponds the physical wallet 604.

The non-transitory memory component 614 and/or the non-transitory data storage 616 may include one or more volatile, non-volatile, and/or replaceable storage components, such as magnetic, optical, and/or flash storage that may be integrated in whole or in part with the one or more hardware processors 612. Further, the memory component 614 may include or take the form of a non-transitory computer-readable storage medium, having stored thereon computer-readable instructions that, when executed by the hardware processing component 612, cause the server 602 to perform operations described in this disclosure, illustrated by the accompanying figures, and/or otherwise contemplated herein.

The communication interface component 618 may take a variety of forms and may be configured to allow the server 602 to communicate with one or more devices, such as the client devices 604 and/or 606. For example, the communication interface 618 may include a transceiver that enables the server 602 to communicate with the client devices 604 and/or 606 over the one or more communication networks 608. In some instances, the communication interface 618 may include a wired interface, such as an Ethernet interface, to communicate with the client devices 604 and/or 606, further, in some instances, the communication interface 618 may include a cellular interface, such as a Global System for Mobile Communications (GSM) interface, a Code Division Multiple Access (CDMA) interface, and/or a Time Division Multiple Access (TDMA) interface. In one example, where the server 602 is a wireless server, the communication interface 618 may include a wireless local area network interface such as a FI interface configured to communicate with a number of different protocols. As such, the communication interface 618 may include a wireless interface operable to transfer data over short distances utilizing short-wavelength radio waves in approximately the 2.4 to 2.485 GHz range. In some instances, the communication interface 618 may send/receive data packets 622 and/or 624 to/from client devices 604 and/or 606.

The client devices 604 and 606 may also be configured to perform a variety of operations as further described herein. In particular, the client devices 604 and 606 may be configured to transfer data packets 622 and/or 624 to and from the server 602. The data packets 622 and/or 624 may include data retrieved from an operating system, detection data, location data, data generated based on respective locations of the client device 604 and 606, mobile application data, data associated with configurations of the mobile applications, device configuration data, content and/or related data, image data, inquiry data, and/or response data, among other types of data. Further, the data packets 622 and/or 624 may also include location data such as Global Positioning System (UPS) data or UPS coordinate data, triangulation data, beacon data, WI-FI data, sensor data, movement data, and/or temperature data, among other types of data.

In some embodiments, the client devices 604 and 606 may take the form of a physical wallet, a smartphone, a personal computer (PC) such as a laptop device, a tablet computer device, a point-of-sale (POS) device, a card reader device, a wearable computer device, a head-mountable display (HMD) device, a smart watch device, and/or other types of computing devices configured to transfer data associated with a user account. The client devices 604 and 606 may include various components, including, for example, input/output (I/O) interfaces 630 and 640, communication interfaces 632 and 642, hardware processors 634 and 644, and non-transitory data storages 636 and 646, respectively, all of which may be communicatively linked with each other via a system bus, network, or other connection mechanisms 638 and 648, respectively.

The I/O interfaces 630 and 640 may be configured to receive inputs from and provide outputs to respective users of the client devices 604 and 606. For example, the I/O interface 630 may include a graphical user interface (GUI) configured to receive a user input that activates the provider application with the other applications. Thus, the I/O interfaces 630 and 640 may include displays and/or input hardware with tangible surfaces such as touchscreens with touch sensors and/or proximity sensors configured with variable sensitivities to detect the user touches and touch inputs. The I/O interfaces 630 and 640 may also be synched with a microphone, sound speakers, and/or other audio mechanisms configured to receive voice commands. Further, the I/O interfaces 630 and 640 may also include a computer mouse, a keyboard, and/or other interface mechanisms. In addition, I/O interfaces 630 and 640 may include output hardware, such as one or more touchscreen displays, haptic feedback systems, and/or other hardware components.

In some embodiments, communication interfaces 632 and 642 may take a variety of forms. For example, communication interfaces 632 and 642 may be configured to allow client devices 604 and 606, respectively, to communicate with one or more other devices according to a number of protocols described herein. For instance, communication interfaces 632 and 642 may be configured to allow client devices 604 and 606, respectively, to communicate with the server 602 over the one or more communication networks 608. The processors 634 and 644 may include one or more multi-purpose processors, microprocessors, special purpose processors, digital signal processors (DSP), application specific integrated circuits (ASIC), programmable system-on-chips (SOC), field-programmable gate arrays (FPGA), and/or other types of processing components described or contemplated herein. As shown, the processor 634 may be implemented with an operating system, such as ANDROID™ OS, iPhone™ OS, and/or WINDOWS™ mobile, among other possibilities.

The data storages 636 and 646 may include one or more volatile, non-volatile, removable, and/or non-removable storage components, and may be integrated in whole or in part with processors 634 and 644, respectively. Further, data storages 636 and 646 may include or take the form of non-transitory computer-readable mediums, having stored thereon instructions that, when executed by processors 634 and 644, cause the client devices 604 and 606 to perform operations, respectively, such as those described in this disclosure, illustrated by the accompanying figures, and/or otherwise contemplated herein.

In some embodiments, a provider application may be installed on the client device 604, where the client device 604 may take the form of the wallet 106. The provider application may give the user of the client device 604 access to the user's account with a provider, such as PayPal, Inc. of San Jose, CA, USA. Further, the client device 604 may be configured to transfer funds to and from the user account. In particular, the client device 604 may be used to generate and/or transfer the data packet 622 to request a connection with the server 602. As such, the data packet 622 may initiate a search of an internet protocol (IP) address of the server 602 that may take the form of the IP address, "192.168.1.102," for example. In some instances, an intermediate server, e.g., a domain name server (DNS) and/or a web server, possibly in the one or more networks 608 may identify the IP address of the server 602 to establish the connection between the client device 604 and the server 602. As such, the server 602 may complete the transfer of funds, possibly based on the data packet 622 that the server 602 retrieves.

It can be appreciated that the server 602 and the client devices 604 and/or 606 may be deployed in various other ways. For example, the operations performed by the server 602 and/or the client devices 604 and 606 may be performed by a greater or a fewer number of devices. Further, the operations performed by two or more of the devices 602, 604, and/or 606 may be combined and performed by a single device. Yet further, the operations performed by a single device may be separated or distributed among the server 602 and the client devices 604 and/or 606. In addition, the client devices 604 and/or 606 may be operated and/or maintained by different users such that each client device 604 and/or 606 may be associated with respective user accounts.

The present disclosure, the accompanying figures, and the claims are not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

The invention claimed is:

1. A system, comprising:
   a non-transitory memory; and
   one or more hardware processors coupled to the non-transitory memory and configured to execute instructions to cause the system to perform operations comprising:
   detecting a wallet location of a physical wallet via a microcontroller embedded in the physical wallet and at least one device in communication with the microcontroller;
   detecting a user location of a user associated with the physical wallet via a mobile device of the user;
   determining a distance between the wallet location and the user location;
   detecting that the physical wallet is holding one or more wallet cards via the microcontroller and one or more detection sleeves of the physical wallet;

determining card information for the one or more wallet cards from one or more readings of the one or more wallet cards in the physical wallet by the one or more detection sleeves;

deactivating, using the card information, the one or more wallet cards in the physical wallet based at least on the determined distance and the one or more wallet cards detected being physically held by the physical wallet;

communicating with one or more networks to issue one or more replacement cards based at least on the one or more deactivated wallet cards;

requesting one or more tokens based at least on communicating with the one or more networks, wherein the one or more tokens correspond to the one or more replacement cards; and transmitting the one or more tokens to one or more user devices, wherein the one or more tokens enable the one or more user devices to perform transactions associated with the one or more replacement cards.

2. The system of claim 1, wherein the operations further comprise:
causing the one or more user devices to display a digital wallet with one or more replacement digital cards based at least on deactivating the one or more wallet cards, wherein the one or more replacement digital cards correspond to the one or more replacement cards.

3. The system of claim 1, wherein the operations further comprise:
generating a replacement digital wallet based at least on the one or more replacement cards;
detecting a card is added to a replacement physical wallet comprising the one or more replacement cards; and
updating the replacement digital wallet to include a digital card that corresponds to the card added to the replacement physical wallet.

4. The system of claim 1, wherein communicating with the one or more networks causes one or more issuers to provide the one or more replacement cards based at least on the one or more deactivated cards.

5. The system of claim 1, wherein the one or more tokens enable the one or more user devices to perform the transactions with a merchant device, and wherein transactions are performed with one or more replacement digital cards.

6. The system of claim 1, wherein the operations further comprise:
determining transaction data associated with the one or more wallet cards, wherein the transaction data comprises location data that indicates the wallet location is outside of one or more geographic zones of the user location; and
determining a friction score meets or exceeds a deactivate threshold based at least on the wallet location being outside of one or more geographic zones,
wherein the one or more wallet cards is deactivated based on the friction score that meets or exceeds the deactivate threshold.

7. The system of claim 1, wherein the operations further comprise:
determining first transaction data associated with a first card of the one or more wallet cards, wherein the first transaction data comprises first location data, first time data, and first amount data;
determining second transaction data associated with a second card of the one or more wallet cards, wherein the second transaction data comprises second location data, second time data, and second amount data; and
determining a friction score meets or exceeds a deactivate threshold based at least on the first location data, the first time data, the first amount data, the second location data, the second time data, and the second amount data,
wherein the one or more wallet cards is deactivated based on the friction score that meets or exceeds the deactivate threshold.

8. A method comprising:
detecting a wallet location of a physical wallet via a microcontroller embedded in the physical wallet and at least one device in communication with the microcontroller;
detecting a user location of a user associated with the physical wallet via a mobile device of the user;
determining a distance between the wallet location and the user location;
detecting that the physical wallet is holding one or more wallet cards via the microcontroller configured to read the one or more wallet cards held by the physical wallet;
determining card information for the one or more wallet cards from one or more readings of the one or more wallet cards in the physical wallet;
deactivating, using the card information, the one or more wallet cards in the physical wallet based at least on the determined distance and the one or more wallet cards detected being physically held by the physical wallet;
communicating with one or more networks to issue one or more replacement cards based at least on the one or more deactivated wallet cards;
requesting one or more tokens based at least on communicating with the one or more networks, wherein the one or more tokens correspond to the one or more replacement cards; and
transmitting the one or more tokens to one or more user devices, wherein the one or more tokens enable the one or more user devices to perform transactions associated with the one or more replacement cards.

9. The method of claim 8, further comprising:
causing the one or more user devices to display a digital wallet with one or more replacement digital cards based at least on deactivating the one or more wallet cards, wherein the one or more replacement digital cards correspond to the one or more replacement cards.

10. The method of claim 8, further comprising:
generating a replacement digital wallet based at least on the one or more replacement cards;
detecting a card is added to a replacement physical wallet comprising the one or more replacement cards; and
updating the replacement digital wallet to include a digital card that corresponds to the card added to the replacement physical wallet.

11. The method of claim 8, wherein communicating with the one or more networks causes one or more issuers to provide the one or more replacement cards based at least on the one or more deactivated cards.

12. The method of claim 8, wherein the one or more tokens enable the one or more user devices to perform the transactions with a merchant device, and wherein transactions are performed with one or more replacement digital cards.

13. The method of claim 8, further comprising:
determining transaction data associated with the one or more wallet cards, wherein the transaction data comprises location data that indicates the wallet location is outside of one or more geographic zones of the user location; and determining a friction score meets or exceeds a deactivate threshold based at least on the wallet location outside of one or more geographic zones, wherein the one or more wallet cards is deactivated based on the friction score that meets or exceeds the deactivate threshold.

14. The method of claim 8, further comprising:

determining first transaction data associated with a first card of the one or more wallet cards, wherein the first transaction data comprises first location data, first time data, and first amount data;

determining second transaction data associated with a second card of the one or more wallet cards, wherein the second transaction data comprises second location data, second time data, and second amount data; and determining a friction score meets or exceeds a deactivate threshold based at least on the first location data, the first time data, the first amount data, the second location data, the second time data, and the second amount data, wherein the one or more wallet cards is deactivated based on the friction score that meets or exceeds the deactivate threshold.

15. A non-transitory machine-readable medium having stored thereon machine-readable instructions executable to cause a machine to perform operations comprising:

detecting a wallet location of a physical wallet via a microcontroller embedded in the physical wallet and at least one device in communication with the microcontroller;

detecting a user location of a user associated with the physical wallet via a mobile device of the user;

determining a distance between the wallet location and the user location;

detecting that the physical wallet is holding one or more wallet cards via the microcontroller and one or more detection sleeves of the physical wallet;

determining card information for the one or more wallet cards from one or more readings of the one or more wallet cards in the physical wallet by the one or more detection sleeves;

deactivating, using the card information, the one or more wallet cards in the physical wallet based at least on the determined distance and the one or more wallet cards detected being physically held by the physical wallet;

communicating with one or more networks to issue one or more replacement cards based at least on the one or more deactivated wallet cards;

requesting one or more tokens based at least on communicating with the one or more networks, wherein the one or more tokens correspond to the one or more replacement cards; and transmitting the one or more tokens to one or more user devices, wherein the one or more tokens enable the one or more user devices to perform transactions associated with the one or more replacement cards.

16. The non-transitory machine-readable medium of claim 15, wherein the operations further comprise:

causing the one or more user devices to display a digital wallet with one or more replacement digital cards based at least on deactivating the one or more wallet cards, wherein the one or more replacement digital cards correspond to the one or more replacement cards.

17. The non-transitory machine-readable medium of claim 15, wherein the operations further comprise:

generating a replacement digital wallet based at least on the one or more replacement cards;

detecting a card is added to a replacement physical wallet comprising the one or more replacement cards; and updating the replacement digital wallet to include a digital card that corresponds to the card added to the replacement physical wallet.

18. The non-transitory machine-readable medium of claim 15, wherein communicating with the one or more networks causes one or more issuers to provide the one or more replacement cards based at least on the one or more deactivated cards.

19. The non-transitory machine-readable medium of claim 15, wherein the one or more tokens enable the one or more user devices to perform the transactions with a merchant device, and wherein transactions are performed with one or more replacement digital cards.

20. The non-transitory machine-readable medium of claim 15, wherein the operations further comprise:

determining transaction data associated with the one or more wallet cards, wherein the transaction data comprises location data that indicates the wallet location is outside of one or more geographic zones of the user location; and determining a friction score meets or exceeds a deactivate threshold based at least on the wallet location outside of one or more geographic zones, wherein the one or more wallet cards is deactivated based on the friction score that meets or exceeds the deactivate threshold.

* * * * *